US009130494B2

(12) United States Patent
Benson et al.

(10) Patent No.: US 9,130,494 B2
(45) Date of Patent: Sep. 8, 2015

(54) ELECTRIC MOTOR PHASE CONTROL SYSTEM

(71) Applicant: The Boeing Company, Chicago, IL (US)

(72) Inventors: Christopher Pete Benson, Berkeley, CA (US); Douglas C. Cameron, Ladera Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 139 days.

(21) Appl. No.: 14/037,846

(22) Filed: Sep. 26, 2013

(65) Prior Publication Data
US 2015/0084558 A1  Mar. 26, 2015

(51) Int. Cl.
H03K 5/00 (2006.01)
H02P 6/18 (2006.01)

(52) U.S. Cl.
CPC ..................................... *H02P 6/182* (2013.01)

(58) Field of Classification Search
USPC ............... 318/445, 452, 459, 400.13, 400.14, 318/400.17, 62, 400.03, 778, 264, 2, 72, 318/277
See application file for complete search history.

(56) References Cited

U.S. PATENT DOCUMENTS

| 4,368,411 A | 1/1983 | Kidd |
| 4,528,486 A | 7/1985 | Flaig et al. |
| 5,430,362 A * | 7/1995 | Carr et al. .................... 318/779 |
| 6,388,416 B1 * | 5/2002 | Nakatani et al. .............. 318/700 |
| 8,511,606 B1 | 8/2013 | Lutke et al. |
| 8,884,562 B1 | 11/2014 | Cameron |
| 2002/0146617 A1 | 10/2002 | Johnson et al. |
| 2004/0263104 A1 * | 12/2004 | Iwanaga et al. ............... 318/439 |
| 2005/0179463 A1 | 8/2005 | Kasuya et al. |
| 2008/0275644 A1 | 11/2008 | Macneille et al. |
| 2010/0188031 A1 * | 7/2010 | Shimizu ................... 318/400.11 |
| 2014/0354199 A1 | 12/2014 | Zeng et al. |

FOREIGN PATENT DOCUMENTS

| EP | 0596472 A2 | 5/1994 |
| WO | WO2011149544 A1 | 12/2011 |
| WO | WO2014165502 A1 | 10/2014 |

OTHER PUBLICATIONS

Lawler et al., "Limitations of the Conventional Phase Advance Method for Constant Power Operation of the Brushless DC Motor," Proceedings of the IEEE 2002 SoutheastCon, Apr. 2002, 11 pages.
Cameron, "Quadrant Change Control in Brushless DC Motors," USPTO US. Appl. No. 13/933,803, filed Jul. 2, 2013, 82 pages.
International Search Report and Written Opinion, dated Jul. 22, 2014, regarding Application No. PCT/US2014/033532, 15 pages.
Partial International Search Report, dated Oct. 9, 2014, regarding Application No. PCT/US2014/045045, 7 pages.

(Continued)

*Primary Examiner* — Kawing Chan
*Assistant Examiner* — Jorge L Carrasquillo
(74) *Attorney, Agent, or Firm* — Yee & Associates, P.C.

(57) ABSTRACT

A method and apparatus for controlling an electric motor. A controller is configured to identify a start time for a signal based on a back electromotive force present in an electric motor during operation of the electric motor. The start time is for a position of a rotor relative to a group of coils. The controller is further configured to send the signal to the group of coils using the start time identified. An effect of the back electromotive force on the signal is reduced.

16 Claims, 9 Drawing Sheets

(56) References Cited

OTHER PUBLICATIONS

Dojo, "SCR Applications," Electronic Circuits and Diagram-Electronics Projects and Design. Sep. 15, 2009, 6 pages. http://www.circuitstoday.com/scr-applications.

International Search Report and Written Opinion, dated Jan. 14, 2015, regarding Application No. PCT/US2014/045048, 20 pages.
Extended European Search Report, dated Mar. 20, 2015, regarding Application No. 14190508.3, 8 pages.

* cited by examiner

| | TRIGGER CONDITION | ACTION | |
|---|---|---|---|
| 401 / 406 | ABS( Δ(Δφ)) > 0.5 DEG | SET Δ(Δφ) TO 0.5 DEG | 408 |
| 403 / 410 | THE AVERAGE OF $A_2$ AND $A_3$ IS 25% GREATER THAN $A_4$ *AND* $A_2$ AND $A_3$ ARE GREATER THAN $i_{cmd} A_2$ AND $i_{cmd} A_3$ | SET Δ(Δφ) = -0.25 DEG | 412 |
| 414 / 405 | $A_5$ AND $A_8$ ARE 25% GREATER THAN THE AVERAGE OF $A_3$ AND $A_4$ *AND* $A_3$ AND $A_4$ ARE LESS THAN $i_{cmd} A_3$ AND $i_{cmd} A_4$ | SET Δ(Δφ) = +0.25 DEG | 416 |
| 418 / 407 | Φ ADV > 35 DEG | SET Δ(Δφ) = -0.25 DEG | 420 |

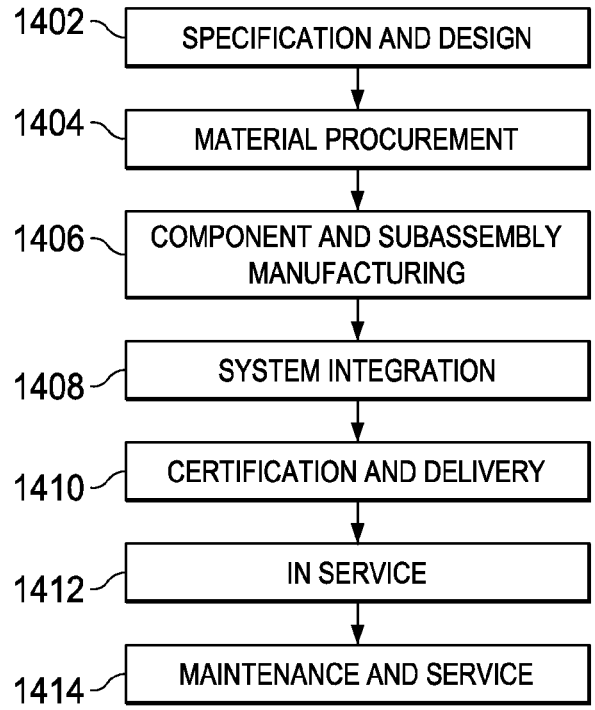
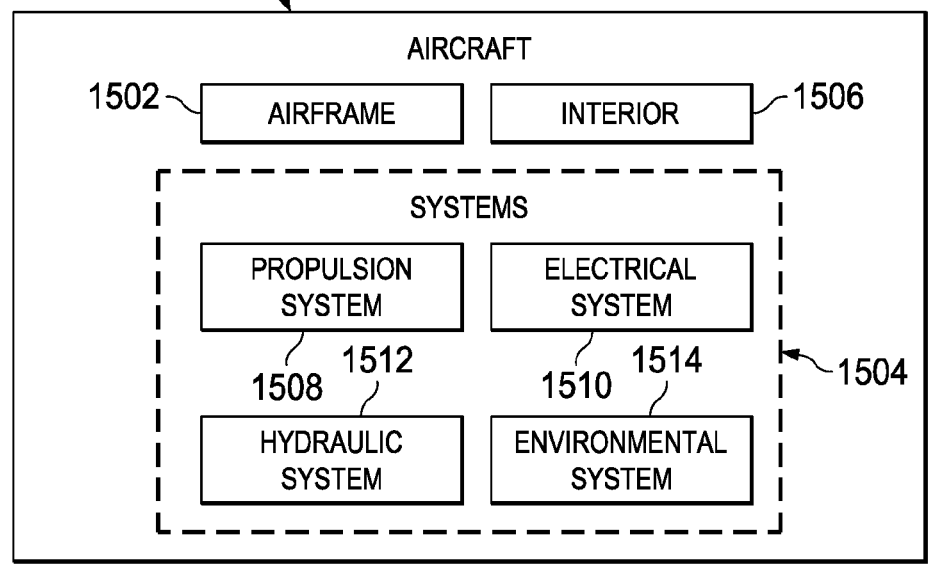

ELECTRIC MOTOR PHASE CONTROL SYSTEM

BACKGROUND INFORMATION

1. Field

The present disclosure relates generally to electric motor systems and, in particular, to controlling electric motor systems. Still more particularly, the present disclosure relates to a method and apparatus for operating an electric motor phase control system for an electric motor in an electric motor system.

2. Background

An electric motor is a device that converts electrical power into mechanical power. Electric motors are used for various applications. These applications include fans, pumps, tools, disk drives, drills, and other types of devices that may be found in these and other types of platforms.

A brushless electric motor is a commonly used type of electric motor. With brushless electric motors, a controller is configured to change the current in windings in the electric motor. The windings may take the form of coils. The current in the coils may be changed by applying a voltage to the coils that causes a desired amount of current to flow through the coils. In particular, the current is switched at a frequency that changes the amplitude of the current flowing through the windings in phases in a manner that causes the motor to turn. The switching of the current is performed using switches in the form of transistors. When direct current is used to operate the brushless electric motor, the motor may take the form of a brushless direct current electric motor.

The switching of the current in the coils may be referred to as a commutation. A commutation occurs when the current from one coil is moved to another. In other words, a commutation occurs when an energized coil is turned off and a non-energized coil is turned on. Turning "on" a coil refers to a state in which current flows through that coil, while turning "off" a coil refers to a state in which current does not flow through the coil. A commutation is used to rotate the magnetic field configuration for operating a brushless electric motor.

The timing of the current in the coils in a brushless electric motor may be described as a phase angle. A phase angle may be a position of the brushless electric motor relative to the coil plane when the current is flowing through one or more of the coils in the brushless electric motor.

The application of the current to the coils is timed such that the brushless electric motor turns at a desired speed. As the speed of the brushless electric motor increases, a phenomena called back electromotive force (EMF) may affect the performance of the brushless electric motor. The back electromotive force is a voltage which opposes a change in magnetic flux.

Often, the back electromotive force is against the direction of the voltage applied to the coils. This back electromotive force may be present when motion occurs between the coils and a magnetic field.

Back electromotive force increases and decreases over time. With this phenomena, the timing of the application of the voltage to the coils becomes more important as the speed of the brushless electric motor increases. The timing of the current flow to one or more coils may be referred to as commutation time or current start time. In other words, commutation time is the time at which a signal is sent to change the current from one coil to another coil.

As the speed of the brushless electric motor increases, the magnitude of the back electromotive force also increases. As a result, reduced efficiency, current spikes, a reduction in performance, increased noise, and other undesirable effects may occur. Consequently, the brushless electric motor may not perform as desired. Therefore, it would be desirable to have a method and apparatus that take into account at least some of the issues discussed above, as well as other possible issues.

SUMMARY

In one illustrative embodiment, an apparatus comprises a controller. The controller is configured to identify a start time for a signal based on a back electromotive force present in an electric motor during operation of the electric motor. The start time is for a position of a rotor relative to a group of coils. The controller is further configured to send the signal to the group of coils using the start time identified. An effect of the back electromotive force on the signal is reduced.

In another illustrative embodiment, an electric motor system comprises an electric motor, a sensor system, and a controller. The electric motor has a rotor and a group of coils. The sensor system is configured to generate information about a back electromotive force in the electric motor during operation of the electric motor. The controller is configured to receive the information from the sensor system. The controller is further configured to identify a start time for a current based on the back electromotive force present in the electric motor during operation of the electric motor using the information from the sensor system. The start time is for a position of the rotor relative to the group of coils. The controller is still further configured to send the current to the group of coils using the start time identified. An effect of the back electromotive force on a signal is reduced.

In yet another illustrative embodiment, a method for controlling an electric motor is provided. A start time for a signal is identified based on a back electromotive force present in the electric motor during operation of the electric motor. The start time is for a position of a rotor relative to a group of coils in the electric motor. The signal is sent to the group of coils using the start time identified. An effect of the back electromotive force on the signal is reduced.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a block diagram of an aircraft manufacturing and service method in accordance with an illustrative embodiment; and FIG. 15 is an illustration of a block diagram of an aircraft in which an illustrative embodiment may be implemented.

DETAILED DESCRIPTION

The illustrative embodiments recognize and take into account a number of different considerations. For example, the illustrative embodiments recognize and take into account that the timing of the voltage applied to an electric motor may be changed to reduce the effect of a back electromotive force. This change in timing may take the form of a phase advance. For example, the voltage may be applied to the coils when the position of the rotor relative to the coils is at a particular phase angle. The voltage may be applied at an earlier time prior to the phase angle. In other words, switches may be closed to allow a current to flow through the coils at an earlier time. This change in the flow of current is an example of a phase advance. A phase advance may be used to cause the current to flow through the coils in a desired manner.

The illustrative embodiments also recognize and take into account that the timing of the current flow may be based upon a number of factors such as the load and other suitable factors. A "number of," as used herein with reference to factors, means one or more factors. For example, a number of factors is one or more factors.

The illustrative embodiments recognize and take into account that one manner in which the start time for a current may be selected is based on predetermined values for the start time. These predetermined values may be selected for different speeds of the electric motor. The values may be identified using a model of the electric motor and other components in the electric motor environment. These values may be phase angles in a table. These values are used to determine when to send the current through the coils during the operation of the electric motor. In other words, models may be used to determine start times for sending voltage to the coils to cause a desired amount of current to flow through the coils.

The illustrative embodiments recognize and take into account, however, that these models may not take into account as many factors as desired for a desired level of performance for the electric motor in response to a back electromotive force occurring during the operation of the electric motor. For example, temperature changes, load changes, and other factors may result in the predetermined values not providing a desired level of performance.

Thus, the illustrative embodiments provide a method and apparatus for controlling the operation of the electric motor. In one illustrative example, a controller is configured to identify a start time for a signal based on a back electromotive force present in the electric motor during operation of the electric motor. This start time may be referred to as a commutation time. The start time is for a position of a rotor relative to a group of coils. The controller is further configured to send the signal to the group of coils of the start time identified such that an effect of the back electromotive force on the signal is reduced.

Figure 1:
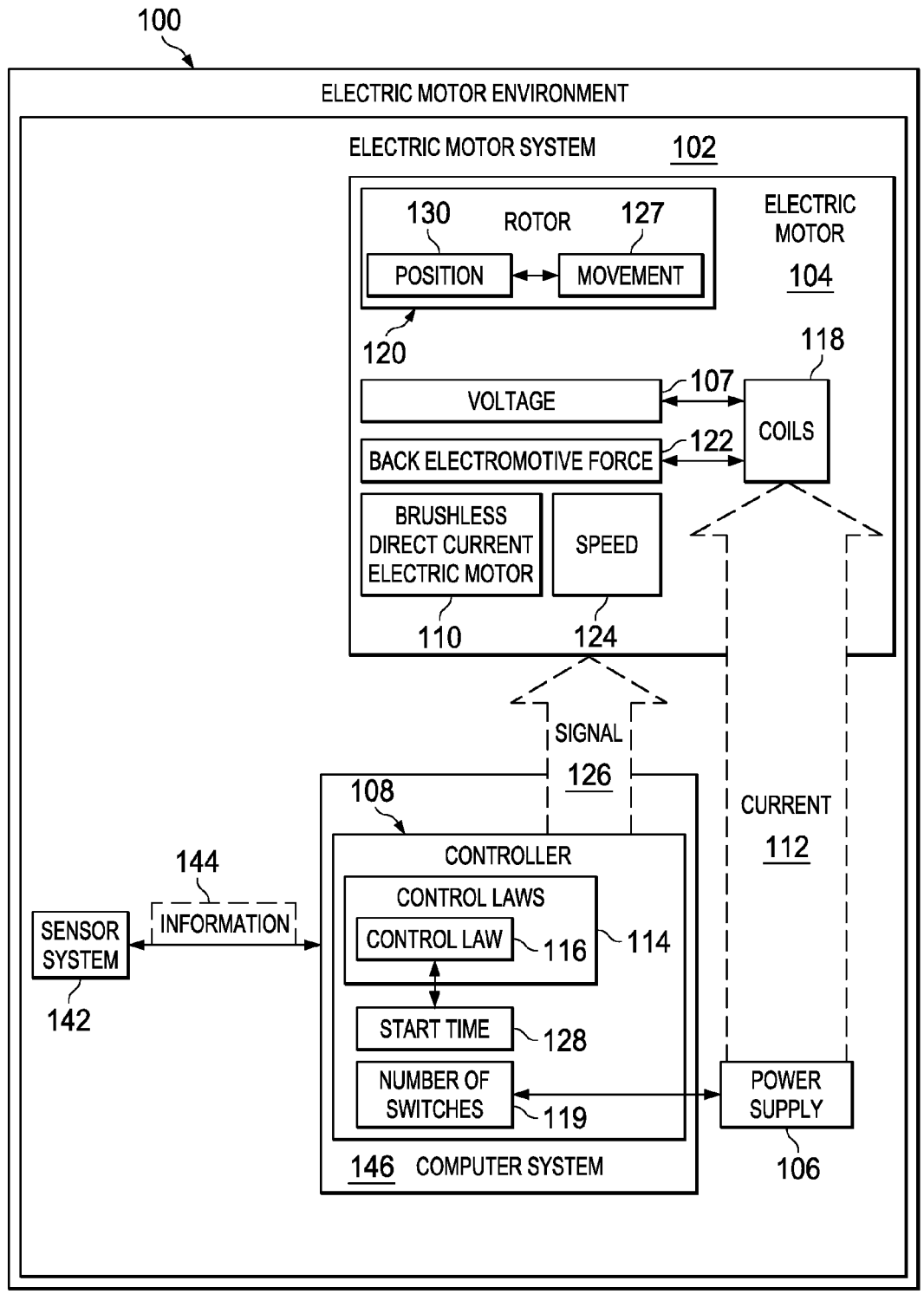
FIG. 1 is an illustration of a block diagram of an electric motor environment in accordance with an illustrative embodiment.

With reference now to the figures and, in particular, with reference to FIG. 1, an illustration of a block diagram of an electric motor environment is depicted in accordance with an illustrative embodiment. Electric motor environment 100 is an example of an environment in which an illustrative embodiment may be implemented.

Electric motor system 102 in electric motor environment 100 includes a number of different components. As depicted, electric motor system 102 includes electric motor 104, power supply 106, and controller 108.

Electric motor 104 is configured to generate rotary or linear torque or force. In these illustrative examples, electric motor 104 takes the form of brushless direct current electric motor 110.

Power supply 106 supplies voltage 107 to electric motor 104 through controller 108. In turn, voltage 107 may cause current 112 to flow through windings in electric motor 104.

Power supply 106 may take various forms. For example, power supply 106 may be selected from at least one of a battery, a power supply unit that converts alternating current to direct current, an electric generator, or some other suitable component.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Controller 108 is a hardware device in these illustrative examples. Controller 108 may include software. The hardware may include circuits that operate to perform the operations in controller 108. In this illustrative example, controller 108 may take the form of an impulse width modulation controller (IWMC) that modulates a switching frequency used to drive switches in the form of transistors that control current 112 sent to electric motor 104.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

For example, controller 108 may be implemented in computer system 146. Computer system 146 includes one or more computers. When more than one computer is present, those computers may communicate with each other through a communications medium such as a network. In other illustrative examples, controller 108 may be implemented in other devices other than computer system 146.

In this illustrative example, control laws 114 are present in controller 108. Control laws 114 are processes, functions, or some other mechanism configured to control the operation of electric motor 104. As depicted, control laws 114 may be implemented in hardware, software, or some combination of the two.

Group of control laws 114 may be used to control operation of electric motor 104 in a desired manner. A "group of," as used herein with reference to items, means one or more items. For example, group of control laws 114 is one or more control laws in control laws 114.

In this illustrative example, control law 116 in group of control laws 114 is configured to control the sending of signal 126 to coils 118 in electric motor 104. In particular, control law 116 is configured to control number of switches 119 to send signal 126 to coils 118.

In the illustrative example, signal 126 is current 112. Voltage 107 is applied to coils 118 by controller 108 such that current 112 is produced in coils 118. As depicted, current 112 causes rotor 120 in electric motor 104 to move.

In this example, the movement of rotor 120 is a turning or rotation. Coils 118 are physically associated with a separate structure from rotor 120 in this illustrative example.

When one component is "physically associated" with another component, the association is a physical association in the depicted examples. For example, a first component, coils 118, may be considered to be physically associated with a second component, a structure, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, extension of the second component, or both.

In this illustrative example, electromotive force (EMF) may be present during the operation of electric motor 104. In particular, back electromotive force 122 may be present and may oppose voltage 107 supplied by power supply 106. As speed 124 of electric motor 104 increases, the effect of back electromotive force 122 also increases in this illustrative example. In this example, speed 124 may be for movement 127 of rotor 120 relative to coils 118.

As depicted, control law 116 in controller 108 may control the sending of signal 126 to coils 118 in a manner that reduces the effect of back electromotive force 122. In particular, control law 116 in controller 108 may be configured to identify start time 128 for signal 126 based on back electromotive force 122 present in electric motor 104 during operation of electric motor 104.

In this illustrative example, start time 128 is the time at which a coil in coils 118 is commanded to be turned on. Turning "on" a coil refers to a state in which current 112 flows through that coil. In other words, start time 128 is the time in which current 112 is caused to flow through that coil. Start time 128 is for position 130 of rotor 120 relative to coils 118. Accordingly, signal 126 may be sent to a single coil or multiple coils in coils 118.

In this illustrative example, controller 108 is also configured to send signal 126 to coils 118 based on start time 128 identified. The selection of start time 128 is made such that an effect of back electromotive force 122 on signal 126 is reduced. In this manner, when signal 126 takes the form of voltage 107 that causes current 112 to flow through coils 118, smaller amounts of voltage 107 may be needed to produce a desired level of current 112 in coils 118 when taking into account the presence of back electromotive force 122.

As a result, the amount of current 112 needed to operate electric motor 104 may be reduced. In this manner, a more efficient operation of electric motor system 102 may occur.

As depicted, electric motor system 102 also may include sensor system 142. Sensor system 142 is configured to generate information 144 about back electromotive force 122. Sensor system 142 is configured to send information 144 to controller 108.

In the illustrative example, sensor system 142 is configured to measure current 112 in coils 118 during operation of electric motor 104. In one example, sensor system 142 may include one or more Hall effect sensors. In other examples, sensor system 142 may include other suitable types of current sensors.

Information 144 about back electromotive force 122 is generated by sensor system 142 from the measurement of current 112 in coils 118. As depicted, information 144 may be values measured for current 112 flowing through coils 118.

With information 144, controller 108 is configured to change start time 128 based on a change in back electromotive force 122. For example, as speed 124 of electric motor 104 changes, back electromotive force 122 also may change. For example, at least one of amplitude, period of time, or other characteristics for back electromotive force 122 may change as speed 124 changes for electric motor 104.

As depicted, controller 108 may identify start time 128 in response to an event. This event may be a periodic event that occurs over a period of a millisecond, ten seconds, three minutes, or some other period of time. The event also may be a non-periodic event such as a signal input by an operator for controller 108 or received from some other device. As a result, start time 128 may be changed during the operation of electric motor 104 in a manner that reduces the effects of back electromotive force 122.

Thus, more efficient control of electric motor 104 may be performed. When start time 128 is identified based on position 130 in the form of a phase, electric motor system 102 may be an electric motor phase control system. In other words, start time 128 may occur when rotor 120 in electric motor 104 has a particular phase for position 130.

Figure 2:
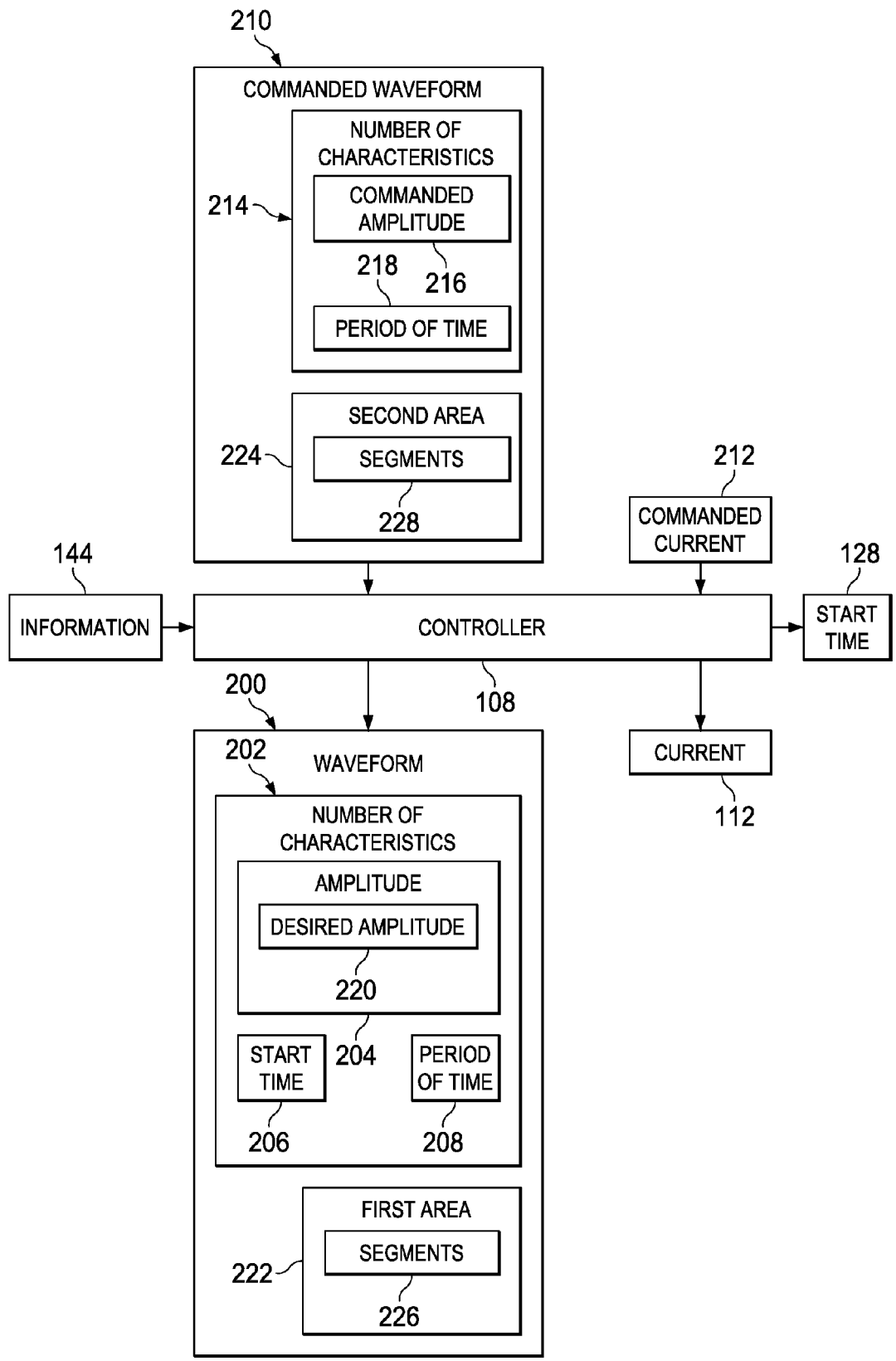
FIG. 2 is an illustration of a block diagram for controlling a current sent to an electric motor in a manner that reduces the effect of a back electromotive force in the electric motor in accordance with an illustrative embodiment.

Turning next to FIG. 2, an illustration of a block diagram for controlling a current sent to an electric motor in a manner that reduces the effect of a back electromotive force in the electric motor is depicted in accordance with an illustrative embodiment. As depicted, controller 108 is configured to identify start time 128 during the operation of electric motor 104 in FIG. 1 using information 144. Start time 128 may be selected based on position 130 of rotor 120 in electric motor 104 relative to coils 118 in FIG. 1.

In the illustrative example, controller 108 identifies start time 128 based on a change in back electromotive force 122 seen in FIG. 1. The change may be identified based on information 144 received during operation of electric motor 104.

As depicted, information 144 is used by controller 108 to identify waveform 200 for current 112 caused by signal 126 in FIG. 1. In particular, information 144 is used by controller 108 to identify waveform 200 for current 112 caused by voltage 107 applied to coils 118. Waveform 200 is affected by back electromotive force 122 and changes as back electromotive force 122 changes.

As depicted, waveform 200 has number of characteristics 202. In the illustrative example, number of characteristics 202 may include, for example, amplitude 204, start time 206, period of time 208, and other characteristics for waveform 200.

Additionally, commanded waveform 210 is present for electric motor 104. Commanded waveform 210 is a waveform resulting from commanded current 212. As depicted, commanded waveform 210 is an example of a waveform that occurs for current 112 flowing in coils 118 when the effect of back electromotive force 122 in sending current 112 through coils 118 is reduced. This reduction may result in electric motor 104 operating as desired.

In this illustrative example, commanded current 212 is a command for one or more values. Commanded current 212 may be used to change the speed at which electric motor 104 operates.

Commanded current 212 may specify number of characteristics 214 for causing current 112 in coils 118. For example, number of characteristics 214 may include commanded amplitude 216, period of time 218, and other suitable characteristics for commanded waveform 210.

In this illustrative example, waveform 200 may have amplitude 204, which may be desired amplitude 220, over period of time 208 based on a selection of start time 128. For example, desired amplitude 220 for waveform 200 may be substantially equal to commanded amplitude 216. As a result, current 112 as commanded for electric motor 104 may be about the same as current 112 in coils 118 in electric motor 104.

In this example, in identifying start time 128, controller 108 compares waveform 200 to commanded waveform 210. Controller 108 identifies first area 222 under waveform 200 and second area 224 under commanded waveform 210. Controller 108 identifies start time 128 based on a difference between first area 222 and second area 224.

For example, controller 108 is configured to advance start time 128 to an earlier start time if first area 222 is less than second area 224 by a selected amount. In these illustrative examples, start time 128 may be advanced to an earlier start time by increasing the phase in which current 112 is caused to flow through coils 118.

As depicted, first area 222 may be identified by dividing waveform 200 into segments 226. First area 222 may then be identified from segments 226. Dividing waveform 200 into segments 226 may be performed when waveform 220 has an irregular shape. In a similar fashion, second area 224 also may be identified by dividing commanded waveform 210 into segments 228.

The illustration of electric motor environment 100 and the different components in FIG. 1 and FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 108 may be configured to control one or more electric motors in addition to electric motor 104. Further, controller 108 may take other forms other than an impulse width modulation controller. For example, controller 108 also may be a pulse width modulation controller in some illustrative examples.

Additionally, although number of switches 119 are shown in controller 108 in this example, in other illustrative examples, controller 108 may comprise only control law 116. In this case, number of switches 119 may be a separate component.

As another example, although the movement of rotor 120 relative to coils 118 has been described as a rotational movement, other types of movement may be present when electric motor 104 takes other forms. For example, electric motor 104 also may be selected from one of a reluctance motor, a variable reluctance motor, and a virtual ellipse device. As an example, when electric motor 104 is a virtual ellipse device, movement 127 of rotor 120 may be a nutating or wobbling movement rather than a rotational movement.

Figures 3, 4:
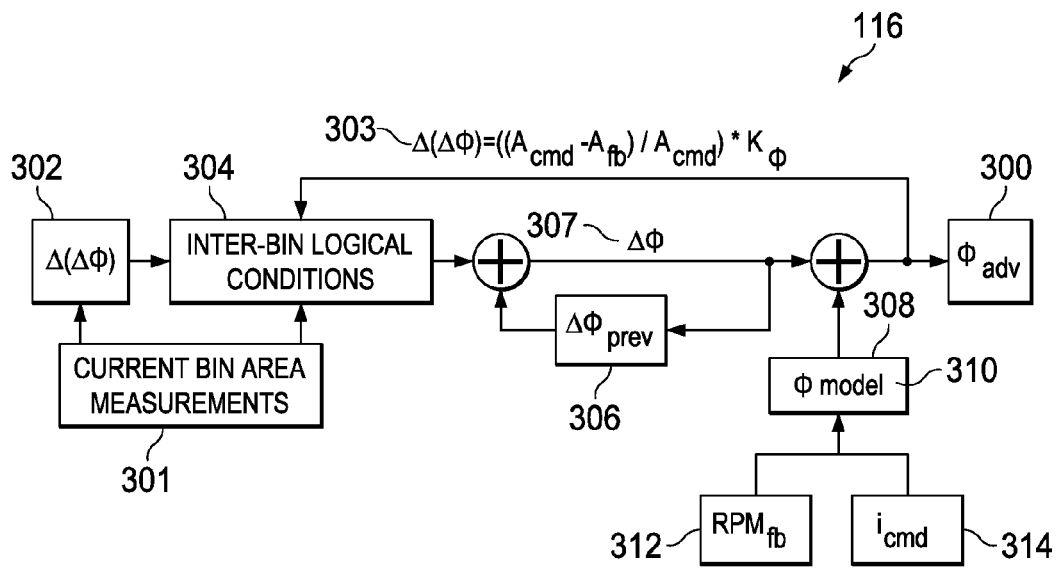
FIG. 3 is an illustration of a control law for identifying a phase advance in an electric motor in accordance with an illustrative embodiment.
FIG. 4 is an illustration of inter-bin logical constraints in accordance with an illustrative embodiment.

With reference next to FIG. 3, an illustration of a control law for identifying a phase advance in an electric motor is depicted in accordance with an illustrative embodiment. In this depicted example, one example of an implementation for control law 116 in FIG. 1 is shown.

As depicted, control law 116 is configured to identify phase advance ($\phi$adv) 300. Phase advance 300 is an example of position 130 of rotor 120 used to identify start time 128 for current 112 to flow through coils 118 in electric motor 104 in FIG. 1.

Control law 116 includes a number of different components. For example, control law 116 includes current bin area measurements 301, phase correction ($\Delta(\Delta\phi)$) 302, inter-bin logical conditions 304, previous phase advance offset ($\Delta\phi_{prev}$) 306, phase advance offset ($\Delta\phi$) 307, and model 308.

Phase correction 302 may be calculated from current bin area measurements 301. Current bin area measurements 301 include waveform area measurements of commanded current 212 in FIG. 2 and current 112 in this illustrative example. In other words, current bin area measurements 301 include $A_{cmd}$ and $A_{cfb}$. Current bin area measurements 301 are used to calculate phase correction 302 and compare $A_{cmd}$ and $A_{cmd}$ in inter-bin logical conditions 304.

In this illustrative example, phase correction 302 may be calculated using equation 303, where $A_{cmd}$ is the commanded area, $A_{fb}$ is the area under the feedback curve, or the measured area, and $K_\phi$ is a constant.

As depicted, phase correction 302 may then be compared to inter-bin logical conditions 304. Phase correction 302 is compared to inter-bin logical conditions 304 to determine whether inconsistencies exist and changes are needed. Changes may be needed if phase correction 302 violates any of inter-bin logical conditions 304.

After the comparison of phase correction 302 and inter-bin logical conditions 304 is made, phase correction 302 is added to previous phase advance offset 306 to calculate phase advance offset 307. Previous phase advance offset 306 is the phase advance offset from the previous iteration of the logical process according to control law 116.

As illustrated, the rate at which phase advance offset 307 may increase or decrease depends on the proportional constant ($K\phi$) in equation 303. Accordingly, phase advance offset 307 may change over time with the effect of trying to "pull" the current waveform area, $A_{fb}$, to the commanded current area, $A_{cmd}$, with phase correction 302 being proportional to the difference between $A_{cmd}$ and $A_{fb}$ in equation 303.

In this illustrative example, the closer $A_{cmd}$ and $A_{fb}$ become, the smaller phase correction 302 will be. Moreover, phase correction 302 is also linearly proportional to constant $K_\phi$. As a result, the magnitude of phase correction 302 also may be scaled by adjusting this constant. Each time the cycle is repeated, a new phase correction 302 term is added to previous phase advance offset 306 to arrive at a new phase advance offset 307.

Once phase advance offset 307 is determined, the result may then be added to the output of model 308. Model 308 may be a mathematical model that provides a starting point for the phase advance calculation in this example.

As illustrated, model 308 may provide a baseline phase advance value ($\phi_{model}$) 310. Baseline phase advance value 310 may be an estimated phase advance value used to minimize convergence time of the system. In other words, with the use of model 308, it may take less time to reach a desired phase advance for operation of the electric motor than if model 308 is not used. In other examples, model 308 may be omitted.

Model 308 may include a number of different inputs. In this example, model 308 includes measured revolutions per minute ($RPM_{fb}$) 312 and measure current ($i_{cmd}$) 314.

The result of the sum of phase advance offset 307 and baseline phase advance value 310 is phase advance 300. Phase advance 300 is then used by controller 108 to adjust the start time 128.

With reference to FIG. 4, an illustration of inter-bin logical constraints is depicted in accordance with an illustrative embodiment. In this depicted example, table 400 shows different types of inter-bin logical conditions 304 for comparison with phase correction 302 from FIG. 3.

In this illustrative example, column 402 and column 404 are present in table 400 of inter-bin logical conditions 304. Column 402 represents trigger conditions and column 404 represents actions taken in response to each of the trigger conditions. In particular, row 401, row 403, row 405, and row 407 represent four trigger conditions and action pairs in this illustrative example.

In one example, trigger condition 406 occurs when the absolute amount of phase correction is greater than 0.5 degrees. As a result, action 408 is implemented such that phase correction 302 in FIG. 3 is limited to a maximum of about 0.5 degrees per step.

As another example, trigger condition 410 occurs when the average of $A_2$ and $A_3$ is 25% greater than $A_4$, and $A_2$ and $A_3$ are greater than $i_{cmd}A_2$ and $i_{cmd}A_3$, where $A_1$, $A_2$, and $A_3$ are areas of bins under the commanded waveform. These logical conditions may indicate that phase advance 300 is too large. In response, action 412 may be implemented to set phase correction 302 to about −0.25 degrees and thus, reduce phase advance 300.

In another example, trigger condition 414 may occur when $A_5$ and $A_8$ are about 25 percent greater than the average of $A_3$ and $A_4$, and $A_3$ and $A_4$ are less than $i_{cmd}A_3$ and $i_{cmd}A_4$. These conditions may indicate that phase advance 300 is too small. Action 416 is then taken to increase phase advance 300 such that phase correction 302 is set to about 0.25 degrees.

In still another example, trigger condition 418 may occur when phase advance 300 is greater than about 35 degrees. In this example, 35 degrees may be a maximum desired value for phase advance 300. In other examples, the maximum desired value for phase advance 300 may be 5 degrees, 25 degrees, 45 degrees, or some other suitable value. In response to trigger condition 418, action 420 may be implemented to set phase correction 302 to −0.25 degrees.

Table 400 illustrates only a few examples of inter-bin logical conditions 304. A number of additional inter-bin logical conditions 304 may be input into control law 116 in FIG. 1, depending on the functionality involved.

Figure 5:
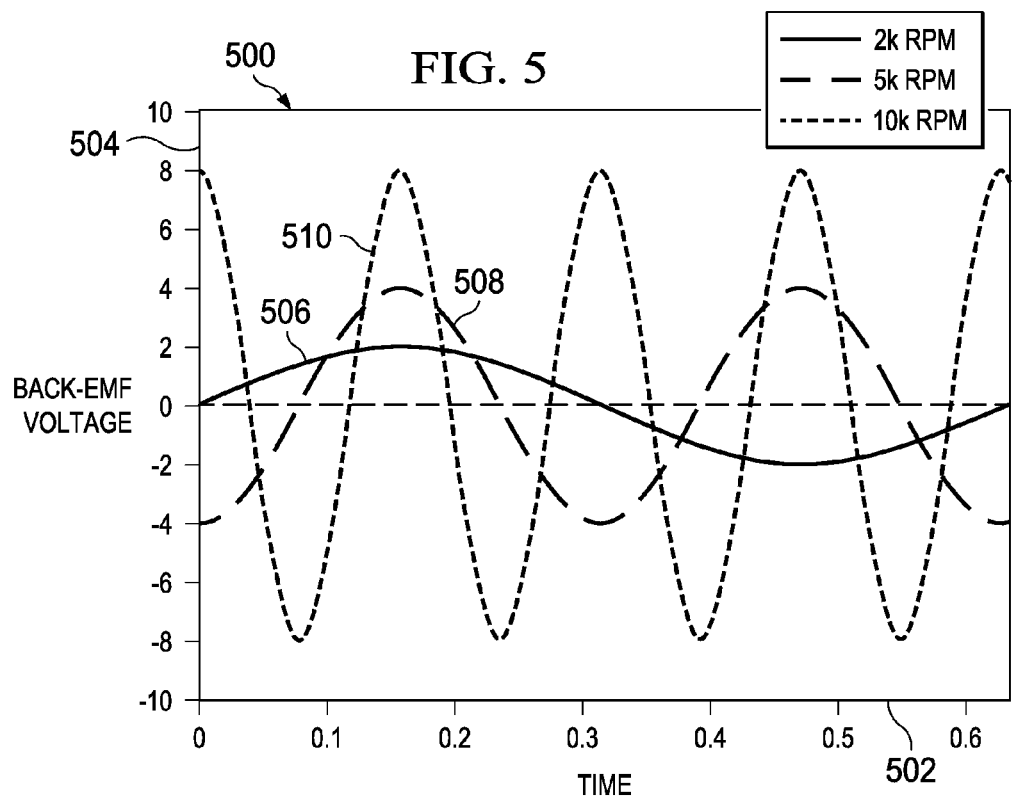
FIG. 5 is an illustration of a graph of a back electromotive force as a function of speed of an electric motor in accordance with an illustrative embodiment.

Turning now to FIG. 5, an illustration of a graph of a back electromotive force as a function of speed of an electric motor is depicted in accordance with an illustrative embodiment. In this illustrative example, graph 500 illustrates a back electromotive force that may be present in an electric motor, such as electric motor 104 in FIG. 1, during operation of the electric motor.

In graph 500, X-axis 502 represents time. Y-axis 504 represents the voltage for a back electromotive force.

As depicted, line 506, line 508, and line 510 represent the back electromotive force present for different speeds of the electric motor. In this example, line 506 represents the back electromotive force present when the electric motor operates at about 2000 revolutions per minute (RPM), line 508 represents the back electromotive force present when the electric motor operates at about 5000 revolutions per minute, and line 510 represents the back electromotive force present when the electric motor operates at about 10,000 revolutions per minute.

As can be seen, the magnitude of the back electromotive force increases as the speed of the electric motor increases. Additionally, the period of time for the back electromotive force also reduces as the speed of electric motor increases. Thus, if a current is sent to coils in an electric motor and an electromotive force is present, the electric motor may not perform as desired. For example, the electric motor may not carry the current at the speed desired, more current than desired may be needed to operate the electric motor, and other effects may occur.

Figure 6:
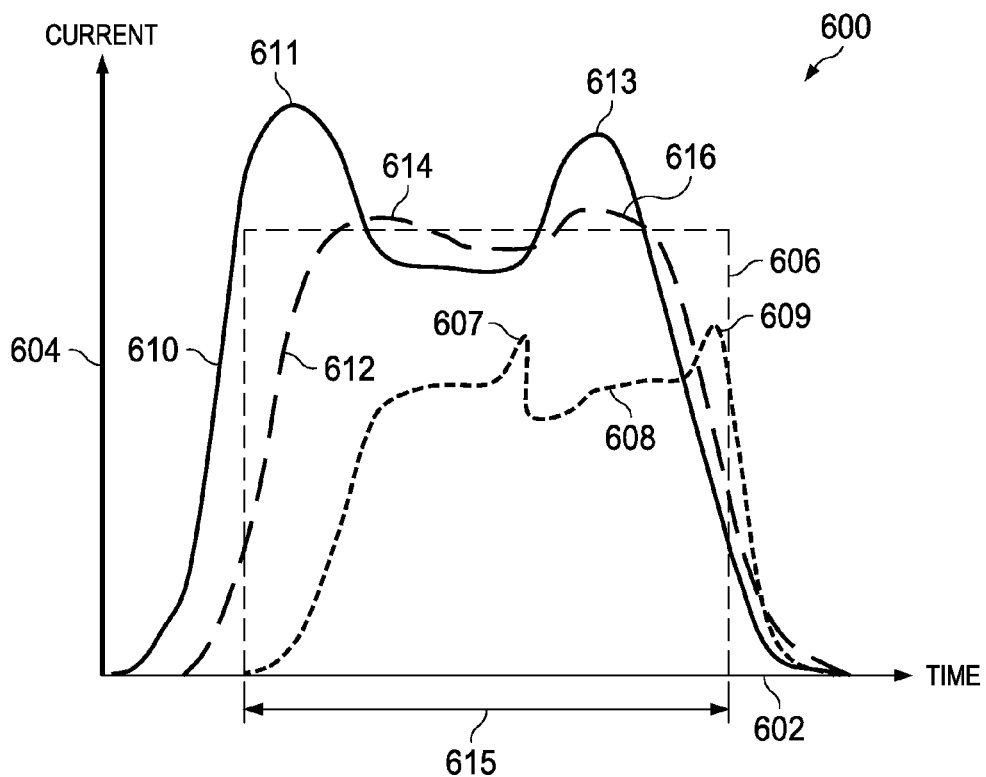
FIG. 6 is an illustration of a graph of waveforms in accordance with an illustrative embodiment.

Turning next to FIG. 6, an illustration of a graph of waveforms is depicted in accordance with an illustrative embodiment. As depicted, graph 600 includes x-axis 602 and y-axis 604. X-axis 602 represents time, while y-axis 604 represents current. This current may be commanded current or actual current, as represented by the different waveforms in graph 600.

In this illustrative example, line 606, line 608, line 610, and line 612 represent waveforms for different currents over a number of commutation periods. Distance 615 along x-axis 602 represents two commutation periods in this example. Accordingly, each of line 606, line 608, line 610, and line 612 represents waveforms shown over two commutation periods.

As illustrated, line 606 represents a waveform for a commanded current. This commanded current may be one example of an implementation for commanded current 212 in FIG. 2. It may be desirable to operate electric motor 104 in FIG. 1 such that the actual current is substantially equal to the commanded current. With the back electromotive force, however, control law 116 is needed to determine the desired phase advance to provide a current that is as close as possible to commanded current 212. Line 608, line 610, and line 612 represent waveforms for different phase advance values in this examples.

As depicted, line 608 represents a waveform with no phase advance. In this instance, commutation began later than desired. Control law 116, as described above, is not used to determine the desired phase advance in this example.

Operation of electric motor 104 under these conditions may be undesirable. As shown, a waveform for current with no phase advance does not reach the commanded current of line 606. The current values along line 608 are substantially less than the commanded current values shown along line 606. This scenario leads to electric motor 104 being unable to operate at the commanded speed or load. In other words, the commanded revolutions per minute and torque may be more than electric motor 104 could produce without phase advance.

Peak 607 and peak 609 in line 608 show spikes in the level of current for an electric motor with no phase advance. Peak 607 occurs toward the end of the first commutation period, while peak 609 occurs toward the end of the second commutation period. In this example, peak 607 and peak 609 are a result of the back electromotive force decreasing on the back side of the sine wave. Without the use of control law 116, the back electromotive force rapidly drops off and leads to an increase in current as the control law tries to compensate.

As illustrated, line 610 represents a waveform for a current that has a phase advance greater than desired. In this instance, commutation is initiated sooner than desired, causing a rapid increase in the current before the back electromotive force becomes large enough in amplitude to slow the ascent of the current. In other words, a greater than desired phase advance may lead to a current "overshoot," where the current exceeds the commanded current, as shown by peak 611 and peak 613. Peak 611 and peak 613 are undesired in these illustrative examples because these peaks represent inefficiencies in electric motor system 102. For example, electric motor 104 may use more power than needed to operate as desired.

In this illustrative example, line 612 represents a waveform for current with a desired phase advance. As shown, line 612 most closely resembles line 606 for commanded current. As a result, electric motor 104 may operate more efficiently when the waveform resembles line 612 than when the waveform resembles line 608 or line 610.

In this example, the current represented by line 612 may meet the commanded current in line 606 without incurring large overshoots. While peak 614 and peak 616 still occur, these peaks do not lead to large inefficiencies in electric motor 104. With the use of control law 116, a desired phase advance may be calculated and applied by controller 108 in FIG. 1.

Figure 7:
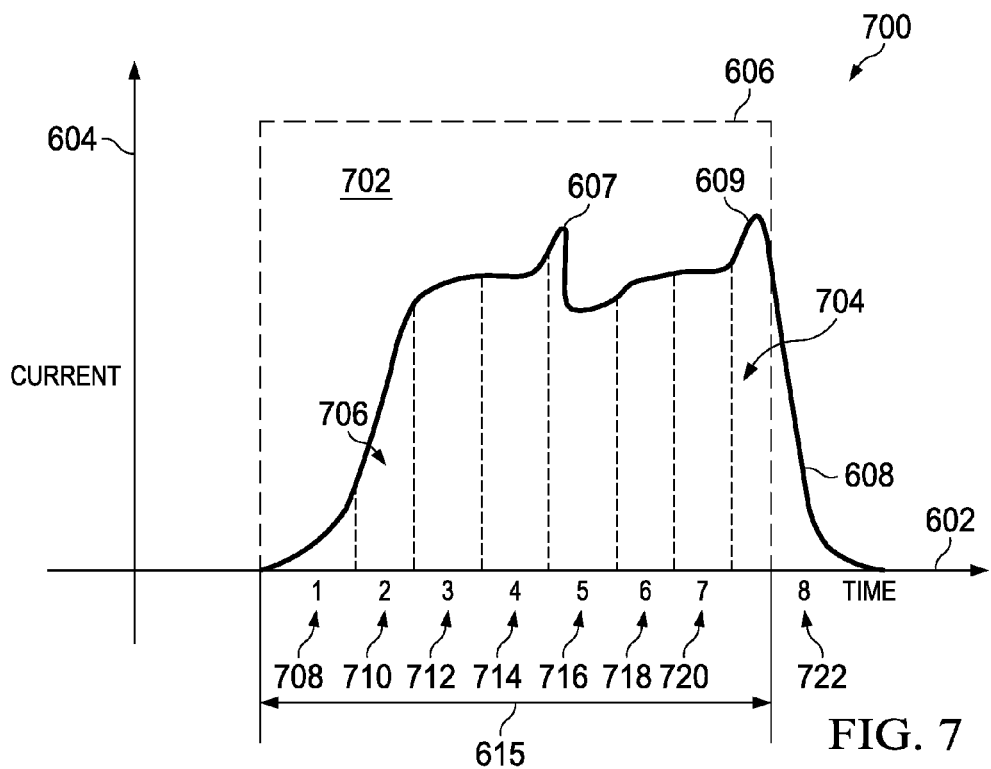
FIG. 7 is an illustration of a graph of a waveform with segments in accordance with an illustrative embodiment.

In FIG. 7, an illustration of a graph of a waveform with segments is depicted in accordance with an illustrative embodiment. In this depicted example, graph 700 shows line 606 and line 608 from FIG. 6.

As illustrated, area 702 represents the total area under line 606. Area 702 may be calculated as the total area under the commanded current curve, or $A_{cmd}$. Area 702 may then be compared to area 704 to determine whether area 702 is substantially equal to area 704 within selected tolerances. If area 704 is less than area 702, additional phase advance may be needed. If area 704 is more than area 702, less phase advance may be needed.

In this example, area 704 represents the total area under line 608 and may be calculated as the total area under the actual current curve, or $A_{fb}$. Area 704 may be separated into segments 706. Segments 706 include segments 708, 710, 712, 714, 716, 718, 720, and 722 under line 608. The corresponding areas for each of segments 708, 710, 712, 714, 716, 718, 720, and 722 are $A_1, A_2, A_3, A_4, A_5, A_6, A_7$, and $A_8$, respectively. Area 704 may be approximated by calculating the areas $A_1$-$A_8$ and adding areas $A_1$-$A_8$. Although eight segments are shown in this illustrative example, other numbers of segments 706 may be used. For example, one segment, five segments, twelve segments, or some other number of segments may be present in area 704. These segments may be known as "bins."

In this example, segments 706 may be used to provide a more accurate comparison of area 702 and area 704. Areas $A_1$-$A_8$ also may provide additional information to controller 108 about the waveform for line 608. For example, the area of the different segments 706 may be compared with one another to construct a waveform profile. In this example, peak 607 and peak 609 occur toward the end of the waveform. By comparing segments 706, a determination of where peak 607 and peak 609 are located may inform controller 108 to increase the phase advance as desired.

As illustrated, area 704 is less than area 702. In particular, area 704 with segments 708, 710, 712, 714, 716, 718, 720, and 722 is less than area 702. As a result, controller 108 may determine that additional phase advance is needed to provide a current that resembles the commanded current of line 606.

After area 702 and 704 are calculated, a relative difference between area 702 and area 704 is calculated using equation $(A_{cmd}-A_{fb})/A_{cmd}$ and then multiplied by a gain constant, $K\phi$, as shown in equation 303 in FIG. 3. The result is phase correction $\Delta(\Delta\phi)$ 302.

Figure 8:
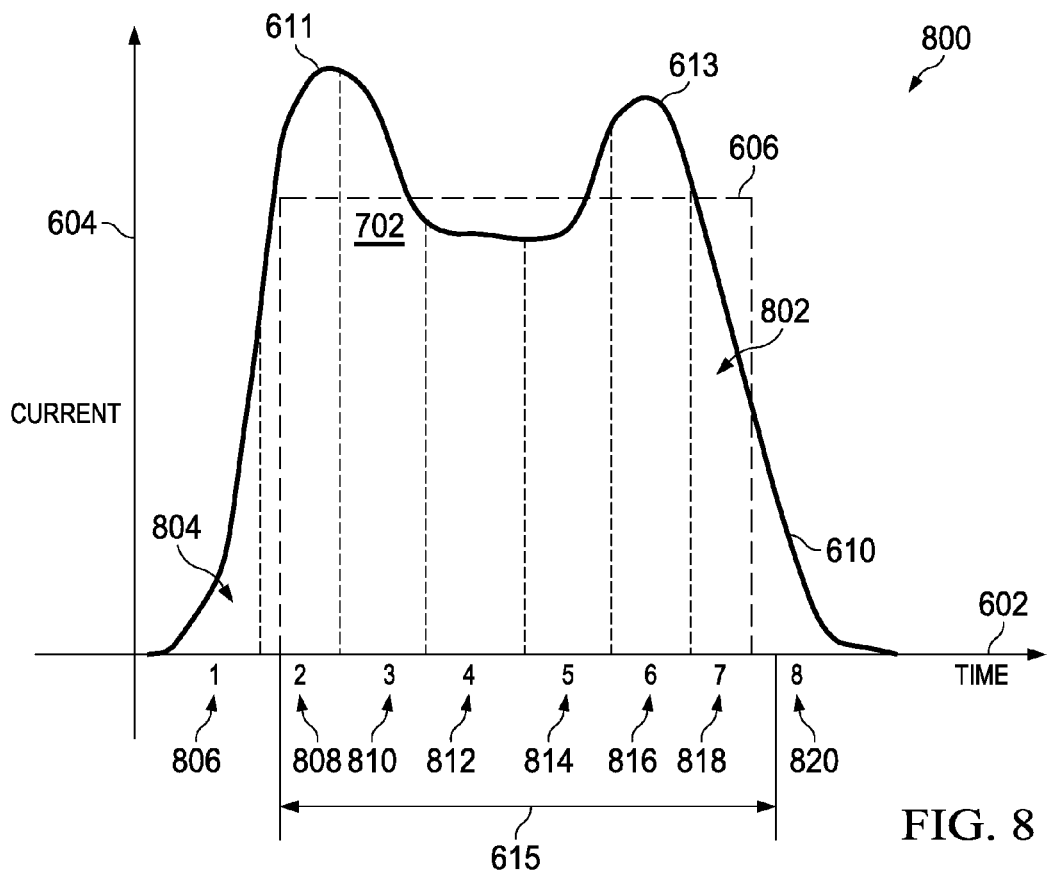
FIG. 8 is another illustration of a graph of a waveform with segments in accordance with an illustrative embodiment.

In FIG. 8, another illustration of a graph of a waveform with segments is depicted in accordance with an illustrative embodiment. In this depicted example, graph 800 shows line 606 and line 610 from FIG. 6.

In this example, area 802 represents the total area under line 610 and may be calculated as the total area under the actual current curve, or $A_{fb}$. Area 802 may be separated into segments 804. Segments 804 include segments 806, 808, 810, 812, 814, 816, 818, and 820 under line 610. The corresponding areas for each of segments 806, 808, 810, 812, 814, 816, 818, and 820 are $A_1, A_2, A_3, A_4, A_5, A_6, A_7$, and $A_8$, respectively. Area 802 may be approximated by calculating the areas $A_1$-$A_8$ and adding areas $A_1$-$A_8$.

In this example, segments 804 may be used to provide a more accurate comparison of area 702 and area 802. Areas $A_1$-$A_8$ also may provide additional information to controller 108 in FIG. 1 about the waveform for line 610. For example, large segments near the beginning of the waveform in line 610 may indicate that the phase advance is larger than desired. As an example, area $A_2$ and $A_3$ are larger than area $A_1$ and $A_4$. From this information, controller 108 may make a determination that peak 611 is present in line 610. If area $A_2$ and $A_3$ are larger than the area for the corresponding portion of area 702 of line 606, more phase advance may be present than desired. As a result, controller 108 may adjust the phase advance based on comparisons between segments 804 using inter-bin logical conditions 304 in FIG. 4.

As illustrated, area 802 is greater than area 702. In particular, area 802 with segments 806, 808, 810, 812, 814, 816, 818, and 820 is greater than area 702. As a result, controller 108 may determine that less phase advance is needed to provide a current that resembles the commanded current of line 606.

After area 702 and area 802 are calculated, a relative difference between area 802 and area 702 is calculated using equation $(A_{cmd}-A_{fb})/A_{cmd}$ and then multiplied by a gain constant, $K\phi$, as shown in equation 303 in FIG. 3. The result is phase advance correction $\Delta(\Delta\phi)$ 302.

Figure 9:
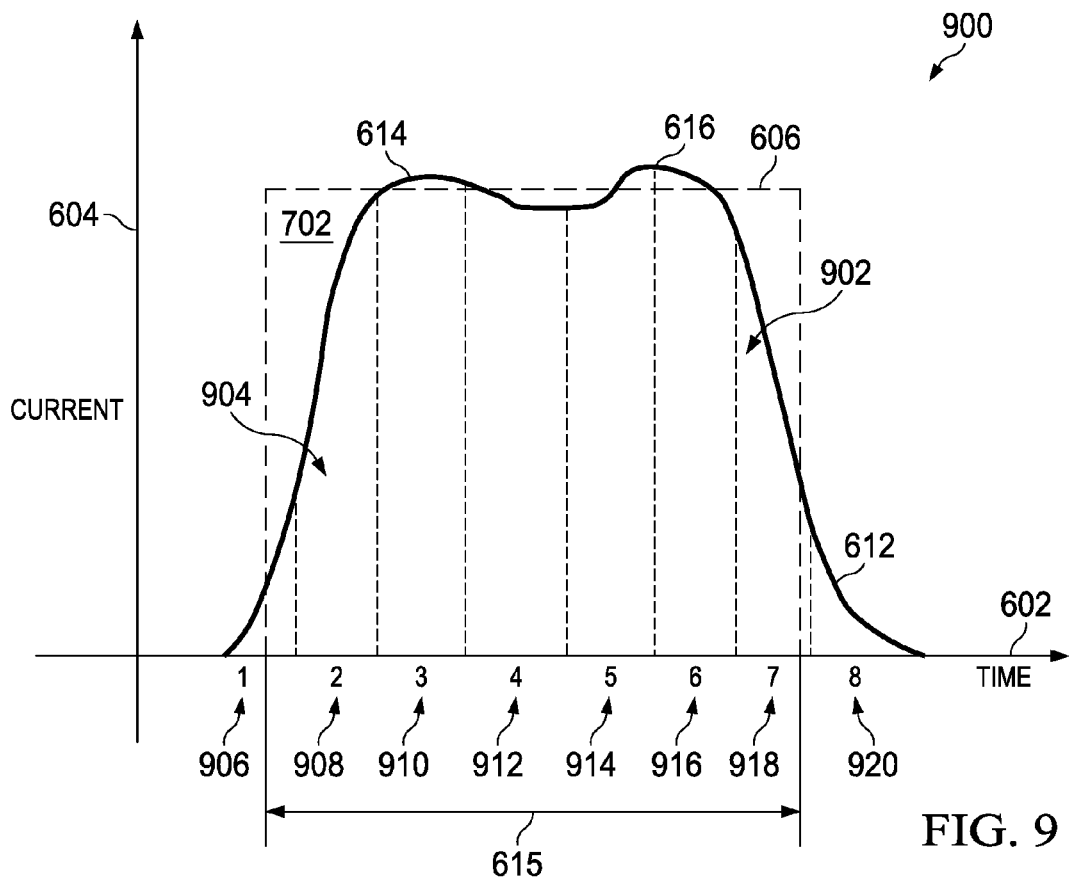
FIG. 9 is yet another illustration of a graph of a waveform with segments in accordance with an illustrative embodiment.

Turning next to FIG. 9, yet another illustration of a graph of a waveform with segments is depicted in accordance with an illustrative embodiment. In this depicted example, graph 900 shows line 606 and line 612 from FIG. 6.

Once a desired phase advance value, $\phi adv$, has been calculated using control law 116 in FIG. 1, the waveform should converge to the shape approximated by line 612. In this case, area 902 in segments 904 may be substantially equal to area 702 within selected tolerances. In particular, area 902 with segments 906, 908, 910, 912, 914, 916, 918, and 920 may be substantially equal to area 702. As a result, the value of the actual current may be close to the value of the commanded current and electric motor 104 in FIG. 1 may be operating efficiently, taking into account the back electromotive force.

As depicted, the waveform and phase advance value may remain in the state shown in FIG. 9 until the operating conditions of electric motor 104 change. For example, upon changing revolutions per minute or load, the phase advance will adapt according to control law 116. In this manner, the illustrative embodiments provide a closed-loop control law for determining a desired phase advance in electric motor 104.

Figure 10:
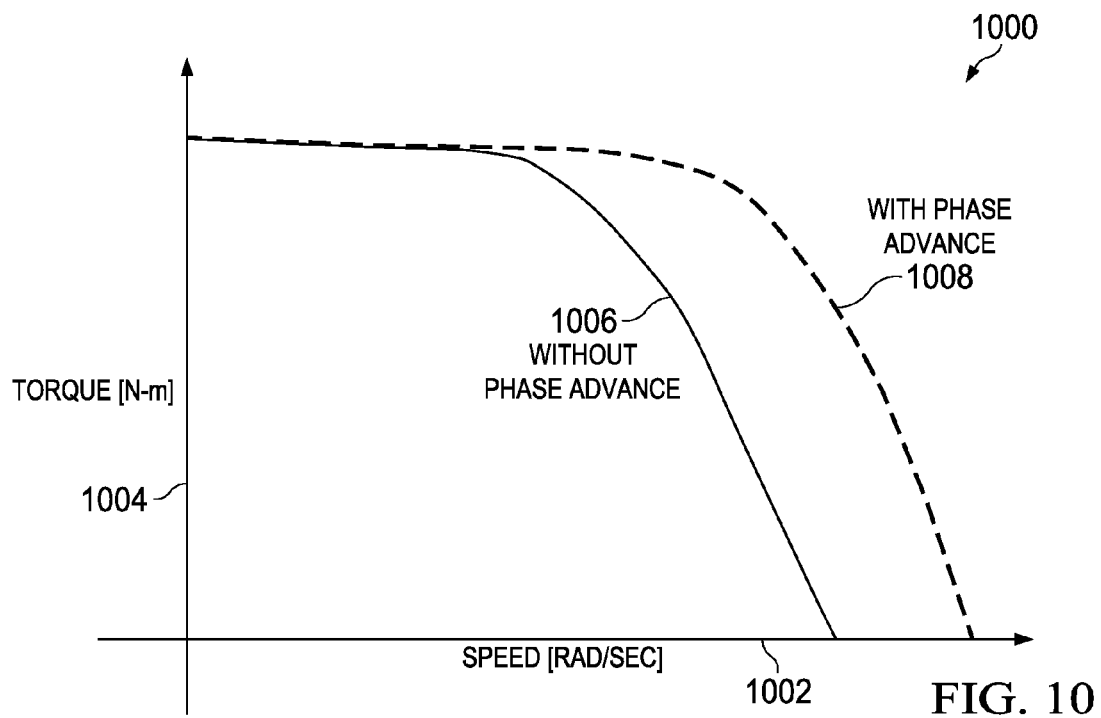
FIG. 10 is an illustration of a graph of a torque-speed curve in accordance with an illustrative embodiment.

Referring to FIG. 10, an illustration of a graph of a torque-speed curve is depicted in accordance with an illustrative embodiment. Graph 1000 shows an example of the performance potential of two electric motors. In this illustrative example, x-axis 1002 represents speed in radians per second, and y-axis 1004 represents torque in newton meters.

It may be desirable to extend the torque-speed curve for electric motor 104 in FIG. 1 by choosing a desired phase advance value. Without using phase advance, the maximum power output (power=speed*torque) is limited.

In this illustrative example, line 1006 shows a torque-speed curve for an electric motor without phase advance, while line 1008 shows a torque-speed curve for an electric motor with phase advance according to control law 116. For an electric motor without phase advance, as the speed increases, the back electromotive force increases, and the torque decreases. This situation may lead to operation of the electric motor in an undesired manner.

As shown, the electric motor with phase advance according to control law 116 may operate more desirably than the electric motor with no phase advance. More torque is available at higher speeds than with the electric motor of line 1006. Phase advance allows the commutation to occur earlier, therefore allowing current 112 in coils 118 to increase before back electromotive force 122 slows the increase in current 112.

Figure 11:
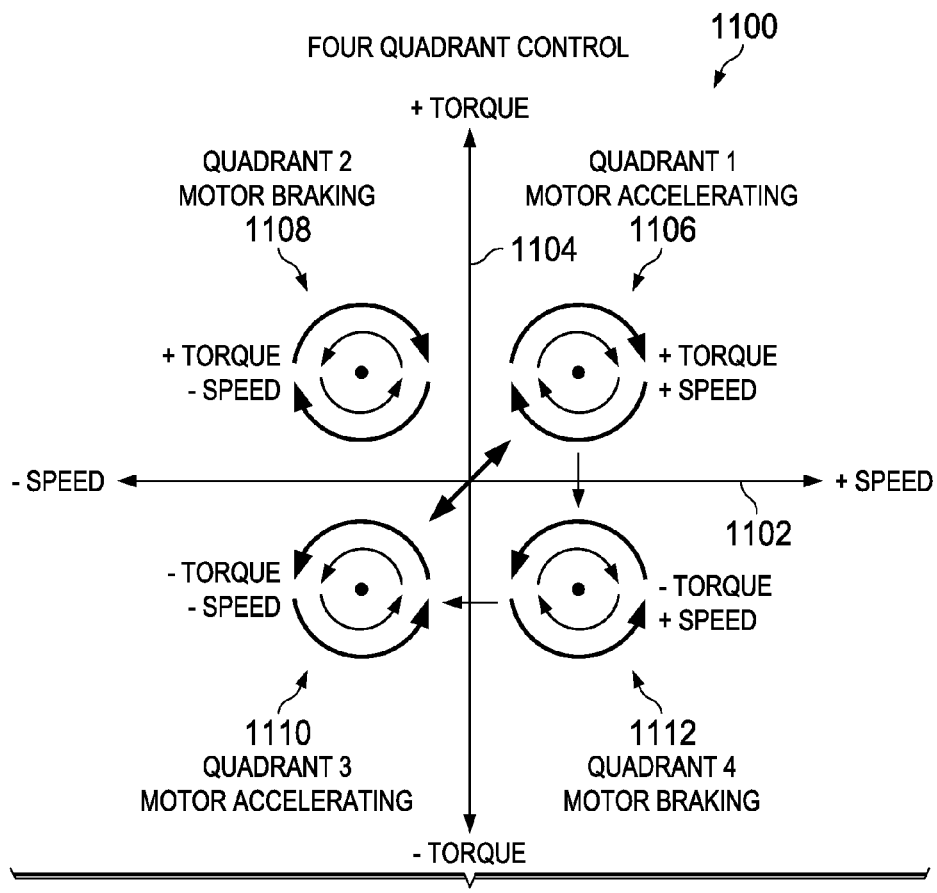
FIG. 11 is an illustration of four-quadrant control in accordance with an illustrative embodiment.

With reference now to FIG. 11, an illustration of four-quadrant control is depicted in accordance with an illustrative embodiment. In this illustrative example, electric motor system 102 in FIG. 1 may be used in multiple instances. In particular, controller 108 may be used to control electric motor 104 to operate in the four quadrants as illustrated by graph 1100. Controller 108 is configured to control operation of electric motor 104 in one or more of the four quadrants illustrated in graph 1100.

As depicted, graph 1100 illustrates torque versus speed. X-axis 1102 represents speed. Y-axis 1104 represents torque. In this illustrative example, first quadrant 1106, second quadrant 1108, third quadrant 1110, and fourth quadrant 1112 are illustrated. First quadrant 1106 represents acceleration of the motor in which speed is in a first direction with torque in a first direction. Second quadrant 1108 represents motor braking in which torque is in the reverse direction while speed is in the forward direction. Third quadrant 1110 represents acceleration of the motor with torque in a second direction and speed in a second direction. Fourth quadrant 1112 represents braking of the motor running in reverse. In this quadrant, the speed is in the reverse direction while the torque is in the forward direction.

The different electric motors in the illustrative examples may be controlled to operate in one or more of the four different quadrants described in FIG. 11. For example, controller 108 in FIG. 1 may control electric motor 104 to operate in one or more of first quadrant 1106, second quadrant 1108, third quadrant 1110, and fourth quadrant 1112.

Figure 12:
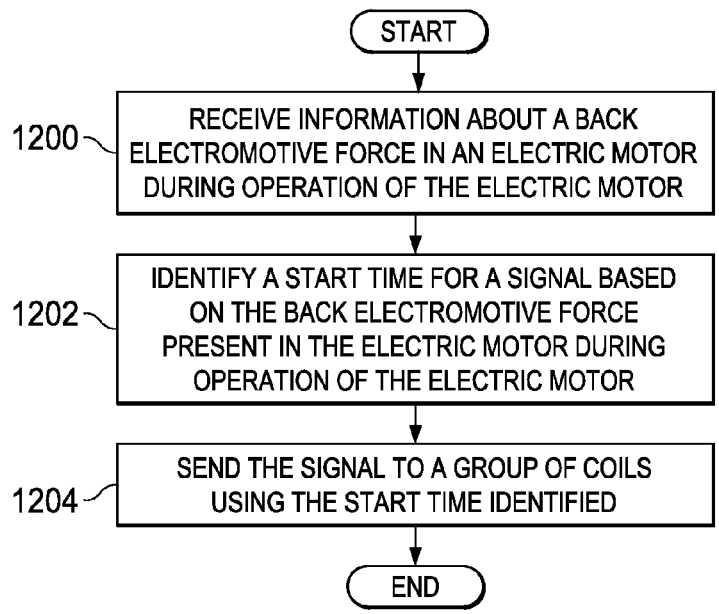
FIG. 12 is an illustration of a flowchart of a process for controlling an electric motor in accordance with an illustrative embodiment.

With reference now to FIG. 12, a flowchart of a process for controlling an electric motor is depicted in accordance with an illustrative. The process illustrated in FIG. 12 may be implemented in electric motor system 102 in electric motor environment 100 to control the operation of electric motor 104 in FIG. 1.

The process begins by receiving information about a back electromotive force in an electric motor during operation of the electric motor (operation 1200). In this illustrative example, the information is a measurement of a current of the coils for generating the information about the back electromotive force.

The process then identifies a start time for a signal based on the back electromotive force present in the electric motor during operation of the electric motor (operation 1202). In this example, the signal is a current sent to the coils in the electric motor. In this illustrative example, the start time is for a position of a rotor relative to a group of coils in the electric motor. This position may be described using a phase angle which also may be referred to as a phase.

The process sends the signal to a group of coils using the start time identified (operation 1204), with the process terminating thereafter. In this manner, the start time may be selected to reduce an effect of the back electromotive force on the signal sent to the coils.

The different operations in FIG. 12 may be repeated any number of times during the operation of an electric motor. These operations may be performed to dynamically adjust the start time or phase for sending current to the electric motor in a manner that reduces the effects of a back electromotive force in the electric motor.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
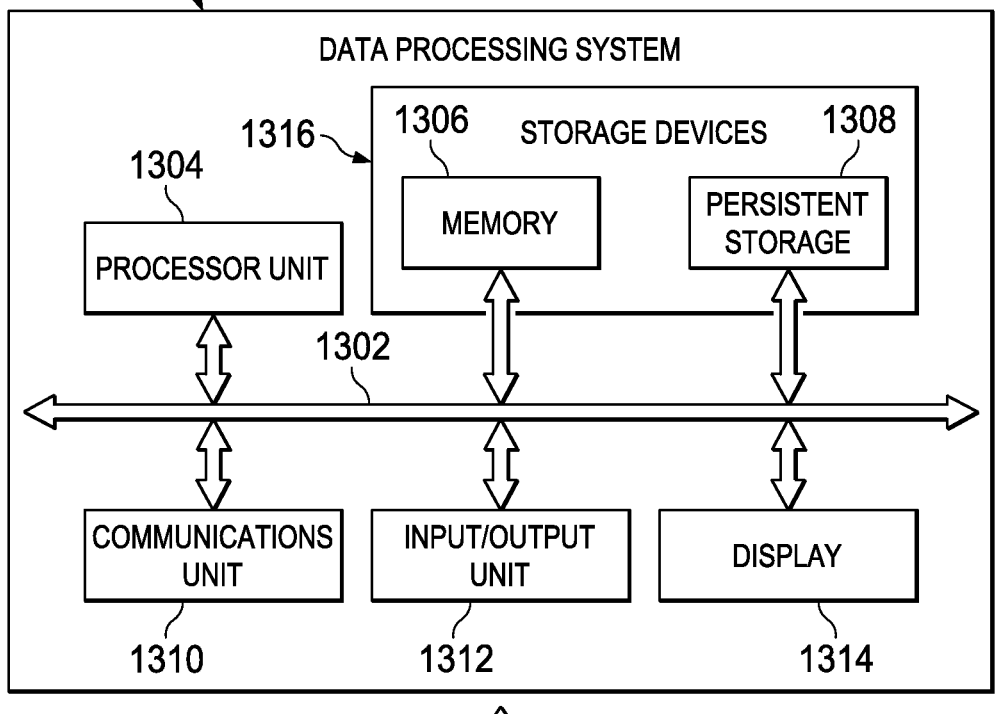
FIG. 13 is an illustration of a block diagram of a data processing system in accordance with an illustrative embodiment.
Figure 13:
Figure 13:
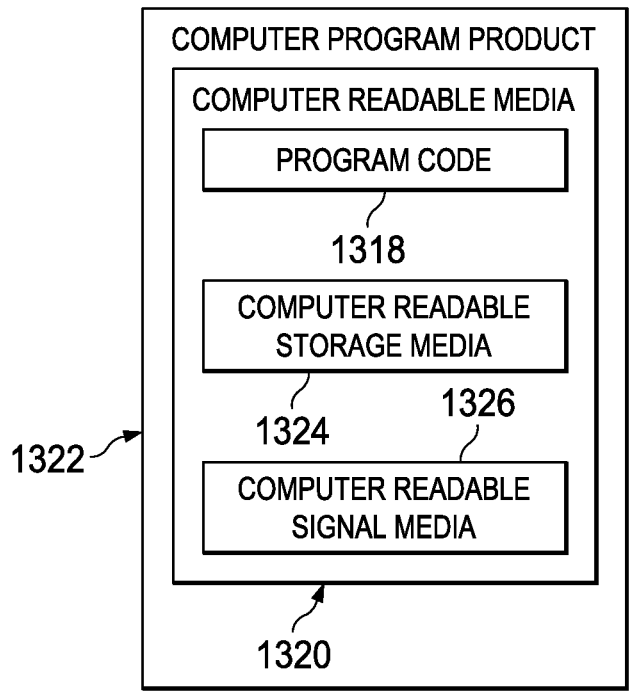

Turning now to FIG. 13, an illustration of a block diagram of a data processing system is depicted in accordance with an illustrative embodiment. Data processing system 1300 may be used to implement computer system 146 in FIG. 1. In this illustrative example, data processing system 1300 includes communications framework 1302, which provides communications between processor unit 1304, memory 1306, persistent storage 1308, communications unit 1310, input/output (I/O) unit 1312, and display 1314. In this example, communication framework may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, data, program code in functional form, and/or other suitable information either on a temporary basis and/or a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through a keyboard, a mouse, and/or some other suitable input device. Further, input/output unit 1312 may send output to a printer. Display 1314 provides a mechanism to display information to a user.

Instructions for the operating system, applications, and/or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1300 are not meant to provide architectural limitations to the manner in which different embodiments may be implemented. The different illustrative embodiments may be implemented in a data processing system including components in addition to and/or in place of those illustrated for data processing system 1300. Other components shown in FIG. 13 can be varied from the illustrative examples shown. The different embodiments may be implemented using any hardware device or system capable of running program code 1318.

Illustrative embodiments of the disclosure may be described in the context of aircraft manufacturing and service method 1400 as shown in FIG. 14 and aircraft 1500 as shown in FIG. 15. Motors in electric motor system 102 may be manufactured during various stages of manufacturing and service method 1400. Additionally, electric motor 104 may be used in manufacturing equipment. In still other examples, controller 108 may be integrated electric motor 104 during maintenance or rework of electric motor 104.

Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

Thus, the illustrative embodiments provide a method and apparatus for controlling the operation of an electric motor. In one illustrative example, a controller is configured to identify a start time for a signal based on a back electromotive force present in the electric motor during operation of the electric motor. The start time is for a position of a rotor relative to a group of coils. The controller is further configured to send the signal to the group of coils for the start time identified such that an effect of the back electromotive force on the signal is reduced.

With the use of an illustrative embodiment, the phase advance of an electric motor may be adjusted automatically using a control law in a controller. The illustrative embodiments provide a closed-loop system that may dynamically adjust the phase advance depending on factors specific to each electric motor. Moreover, the use of models and approximations for commutating an electric motor may be substantially reduced or eliminated.

By choosing a phase advance value based upon speed and load, the maximum torque-speed curve for an electric motor can be realized. As a result, electric motors may run at higher speeds and loads than some currently used systems. Additionally, using phase advance at low speeds may allow the electric motor to run more smoothly, thus increasing the reliability of the electric motor.

Illustrative embodiments also provide a method for identifying abnormalities in a waveform profile for different current conditions. Areas may be used to determine where current peaks occur, thereby generating a waveform profile for use by the controller to dynamically change the operating conditions of electric motor 104 in FIG. 1. A comparison of the areas under a curve representing a particular waveform also may be used to monitor the health of one or more electric motors in an electric motor system. In this manner, the illustrative embodiments increase the operating capabilities of an electric motor system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a controller configured to
     identify a start time for a signal based on a back electromotive force present in an electric motor during operation of the electric motor, wherein the start time is for a position of a rotor relative to a group of coils; and
     send the signal to the group of coils using the start time identified, wherein an effect of the back electromotive force on the signal is reduced;
   wherein the signal is a current in the electric motor and has a waveform and the controller is configured to
     identify a first area under the waveform,
     identify a second area under a commanded waveform resulting from a commanded current for the electric motor, and
     change the start time based on a difference between the first area and the second area; and
   wherein the controller is configured to advance the start time to an earlier start time if the first area is less than the second area by a selected amount.

2. The apparatus of claim 1, wherein the current has a number of characteristics based on the start time and the back electromotive force in the electric motor.

3. The apparatus of claim 2, wherein the waveform for the current has a desired amplitude over a period of time based on a selection of the start time.

4. The apparatus of claim 3, wherein the desired amplitude is substantially equal to a commanded amplitude for the current over the period of time.

5. The apparatus of claim 1 further comprising:
   a sensor system configured to generate information about the back electromotive force and send the information to the controller.

6. The apparatus of claim 5, wherein the sensor system is configured to measure the current in the group of coils to generate the information about the back electromotive force.

7. The apparatus of claim 1, wherein the controller is configured to change the start time based on a change in the back electromotive force.

8. The apparatus of claim 1, wherein the controller is configured to divide the waveform into segments and identify an area under the segments to identify the first area.

9. The apparatus of claim 1, wherein the electric motor is selected from one of a brushless direct current electric motor, a reluctance motor, a variable reluctance motor, and a virtual ellipse device.

10. An electric motor system comprising:
    an electric motor having a rotor and a group of coils;
    a sensor system configured to generate information about a back electromotive force in the electric motor during operation of the electric motor; and
    a controller configured to
      receive the information from the sensor system;
      identify a start time for a current based on the back electromotive force present in the electric motor during operation of the electric motor using the information from the sensor system, wherein the start time is for a position of the rotor relative to the group of coils; and
      send the current to the group of coils using the start time identified, wherein an effect of the back electromotive force on a signal is reduced;
    wherein the current in the electric motor has a waveform and the controller is configured to
      identify a first area under the waveform,
      identify a second area under a commanded waveform resulting from a commanded current for the electric motor, and
      change the start time based on a difference between the first area and the second area.

11. A method for controlling an electric motor, the method comprising:
    identifying a start time for a signal based on a back electromotive force present in the electric motor during operation of the electric motor, wherein the start time is for a position of a rotor relative to a group of coils in the electric motor, and wherein the signal is a current in the electric motor and has a waveform;

identifying a first area under the waveform;

identifying a second area under a commanded waveform resulting from a commanded current for the electric motor;

changing the start time based on a difference between the first area and the second area; and sending the signal to the group of coils using the start time identified, wherein an effect of the back electromotive force on the signal is reduced.

12. The method of claim 11, wherein a waveform for a current has a desired amplitude over a period of time based on a selection of the start time.

13. The method of claim 12, wherein the desired amplitude is substantially equal to a commanded amplitude for the current over the period of time.

14. The method of claim 11 further comprising:

receiving information about the back electromotive force, wherein the information is a measurement of a current of the group of coils to generate the information about the back electromotive force.

15. The method of claim 11 further comprising:

changing the start time based on a change in the back electromotive force.

16. The method of claim 11, wherein the changing step comprises:

advancing the start time to an earlier start time if the first area is less than the second area by a selected amount.

* * * * *